July 30, 1968
A. MULLER
3,394,978
DUAL SIDE SPLIT REARVIEW REFLECTING SYSTEM
Filed April 10, 1964
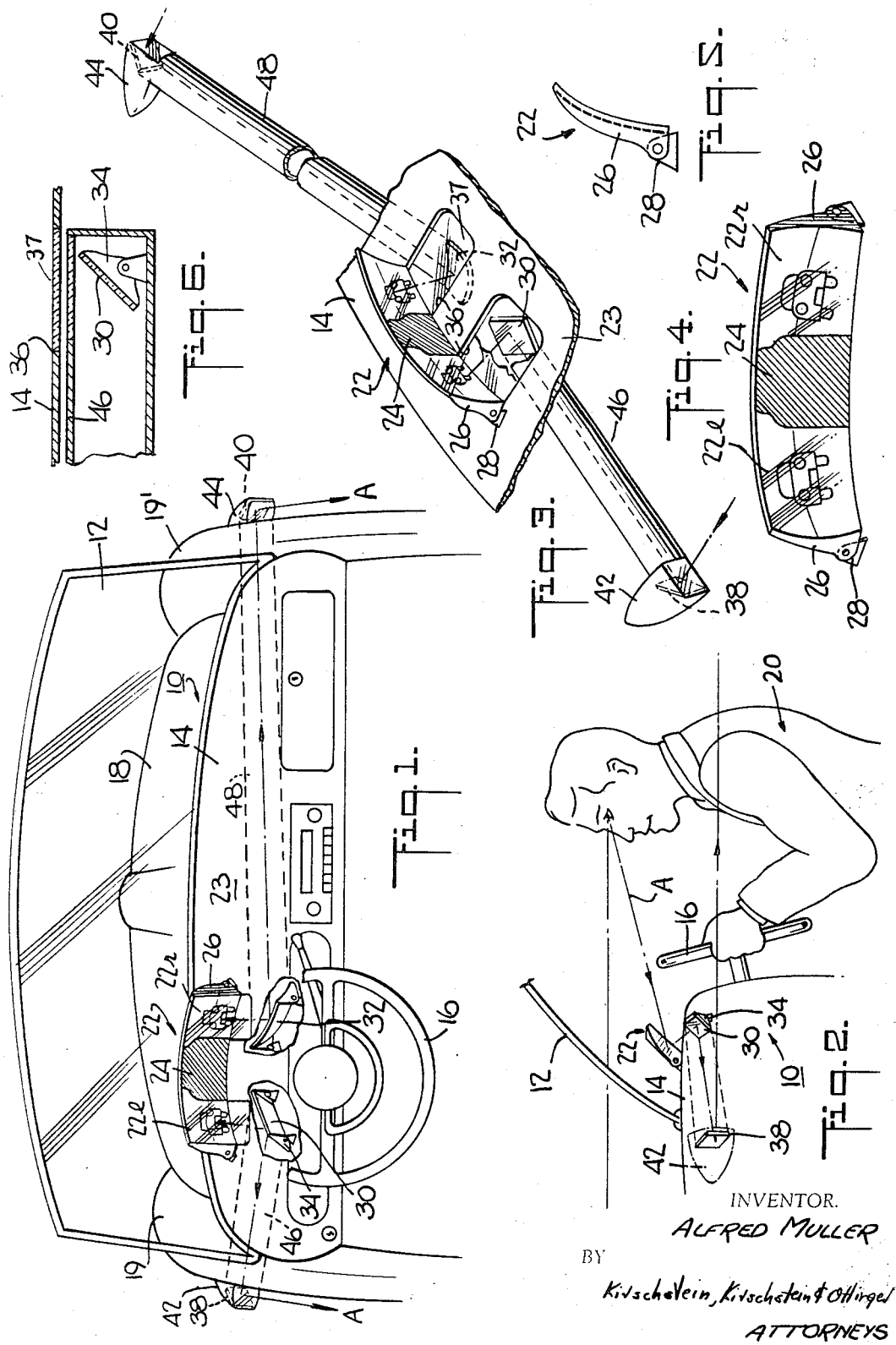
INVENTOR.
ALFRED MULLER
BY
Kilschelein, Kilschstein & Ollinger
ATTORNEYS

United States Patent Office 3,394,978
Patented July 30, 1968

3,394,978
DUAL SIDE SPLIT REARVIEW REFLECTING SYSTEM
Alfred Muller, West Islip, N.Y. (% Al Muller & Associates, Inc., 405 E. 54th St., New York, N.Y. 10022)
Filed Apr. 10, 1964, Ser. No. 358,801
1 Claim. (Cl. 350—294)

ABSTRACT OF THE DISCLOSURE

A rearview reflecting system comprising right and left secondary reflecting surfaces at the right and left sides of a vehicle which respectively reflect horizontal rearward views thereon to right and left intermediate reflecting surfaces within the vehicle which in turn respectively reflect said views on the right and left sides of a single primary reflecting surface within the vehicle in the forward line of vision of the driver, which last-named surface in turn reflects said views to the eyes of a driver of the vehicle. The primary reflecting surface is smoothly continuous from side to side and has its central portion blocked out in the outline of a transverse cross-section of the vehicle to separate the right and left views reflected by said primary reflecting surface.

---

This invention relates to a rearview reflecting system for moving vehicles such as automobiles and the like.

It is an object of my invention to provide a new and improved rearview reflecting system by which the driver of a vehicle will be afforded an unobstructed and clear reflected view of the road and traffic conditions behind his vehicle on both sides thereof.

It is another object of my invention to provide a rearview reflecting system of the character described wherein the reflecting surface, upon which the reflected dual side rearview falls, is located at a position convenient to the eyes of the driver where the driver can immediately see any change in the traffic pattern behind him to either side without shifting his eyes from his normal view forwardly through the windshield of the vehicle.

It is yet another object of my invention to provide a rear view reflecting system of the character described wherein a reflected dual side rearview is presented which has an enlarged field of vision so that a driver may observe traffic and road conditions both at his right rear and left rear without distortion.

It is yet a further object of my invention to provide a rearview reflecting system of the character described wherein a reflected dual side view of rear traffic may be had including its positional relationship to the vehicle being operated by the driver thereof.

It is a further object of my invention to provide a dual side rearview reflecting system of the character described wherein a view may be had towards the rear of an automobile without obstruction by the frame of the rear window or by objects placed on the back ledge of the automobile adjacent to the rear window.

It is a further object of my invention to provide a rearview reflecting system of the character described including a primary reflecting surface which carries an outline of the driven automobile, and on which the traffic to the right rear of the driven automobile and to the left rear of the automobile is reflected, respectively, onto said surface on the right and left of said outline, so that a driver can readily understand the location of rearward traffic with respect to his own vehicle.

It is a further object of my invention to provide a rearview reflecting system of the character described having a single unitary interior mirror on which is reflected a composite of the left and right side rearward views of the road and traffic behind the automobile, and which in an improved manner replaces the exterior left side and right side view mirrors often found on automobiles.

It is another object of my invention to provide a rearview reflecting system of the character described including a primary reflecting surface onto which right and left side images are reflected which are mutually compensated to be of the same size when reflecting objects at the same distance rearwardly of the vehicle.

These and various other objects and advantages of my invention will become apparent to the reader in the following description.

My invention accordingly consists in the features of construction, combinations of elements, and arrangements of parts which will be exemplified in the device hereinafter described and of which the scope of application will be indicated in the appended claim.

In the accompanying drawings in which is shown one of the various possible embodiments of my invention, FIG. 1 is a forward looking perspective view of the front interior of an automobile showing the components of my rearview reflecting system;

FIG. 2 is a schematic side elevational view of the rearview reflecting system and showing the line of sight from the eyes of a driver of a vehicle through the reflecting system and rearward thereafter;

FIG. 3 is a fragmentary broken away enlarged three-quartered perspective view of the rear view reflecting system;

FIG. 4 is an enlarged front elevational view of the primary reflecting surface;

FIG. 5 is a side elevational view of the primary reflecting surface shown in FIG. 4; and FIG. 6 is a sectional detail view of an intermediate reflecting surface, its adjustable mount and its dustproof enclosure tube.

Referring now in detail to the drawings, the reference numeral 10 denotes the forward portion (front half) of a conventional automobile including such standard components as a windshield 12, a dashboard 14, a steering wheel 16, a front hood 18 and fenders 19, 19'. FIG. 2 illustrates the position of a driver 20 seated in the front seat of the automobile with respect to several of the components of the automobile and with respect to my rear view reflecting system.

The rearview reflecting system, constructed in accordance with my invention, includes a primary reflecting surface, to wit, a transversely elongated mirror 22. Optionally, to obtain a small degree of magnification the mirror 22 is rearwardly spherically concave, the concavity being exaggerated in the drawings so that it can be readily seen. Said mirror 22 is mounted on the top ledge 23 of the elongated dashboard 14 of the automobile in front of the driver 20. The mirror is located so that its top edge is below the line of sight of the driver to the top front edge of the hood 18 of the automobile (see FIGS. 1 and 2). Thus, the mirror 22 by virtue of its location closely adjacent the dashboard 14 does not obstruct the view of the driver over the hood 18 and does not block the effective area of forward vision of traffic and the like. The mirror 22 is also located so that view thereof is not blocked by the steering wheel 16 (see FIG. 2).

Other locations for the primary reflecting surface may also be suitable. For example, said surface can be mounted adjacent the top of the windshield 12 in front of the driver.

A central portion, i.e., approximately the central third, of the mirrored surface between its ends is blocked out and has a filled-in non-specular outline 24 which is simulative of a transverse outline of the driven automobile. The outline 24 divides the mirror 22 into a left primary reflecting area 22*l* and a right primary reflecting area 22*r*, each area being of similar configuration and dimensions.

The mirror 22 is rotatably mounted on the dashboard 14 for limited movement about a horizontal axis transverse to the automobile 10. To this end, each vertical side edge of the mirror 22 is affixed to a frame 26, the lower portion of which is pivoted as by a rivet on an upstanding ear 28 which is secured to the dashboard 14. The aforesaid connection is frictionally binding so that the mirror may be rotated with a slight force as by the driver's hand and will thereafter retain its adjusted position.

Intermediate reflecting surfaces, e.g., mirrors, are located beneath the dashboard 14 and below the primary reflecting surface 22. The intermediate surfaces are horizontally forward of the steering wheel 16, in the embodiment set forth in the drawings. These intermediate surfaces comprise a left intermediate reflecting surface 30 and a right intermediate reflecting surface 32. Each of these intermediate reflecting surfaces is supported and held in place by a mount 34 which is attached to an internal wall of the dashboard 14. The left intermediate reflecting surface 30 is flat, i.e., planar, and is angled toward the left primary mirror area 22*l*. The right intermediate reflecting surface 32 is upwardly spherically concave and its concavity is angled toward the right primary mirror area 22*r*. The concavity is exaggerated in the drawings so that it can be seen.

Apertures 36 are cut in the dashboard 14 adjacent the reflecting surfaces 22*l*, 22*r* on each side of the mirror 22 and rearward of the mirror so as to permit unobstructed reflection between the mirror reflecting areas and the respective intermediate reflecting surfaces 30, 32. Desirably, clear glass windows (as at 37) may be placed over the apertures 36 so as to prevent dust and other objects from entering therein.

Secondary reflecting surfaces are located on the exterior of the automobile on each side thereof, optionally adjacent the fenders 19, 19'. Said secondary reflecting surfaces comprise a left secondary plane viewing surface 38 and a right secondary plane viewing surface 40. The left secondary viewing surface 38 is mounted in a faired ornament or holder 42 which is affixed to the outside of the left fender 19 and the right secondary viewing surface is mounted in a similar faired holder 44 affixed to the outside of the right fender 19'. These holders are arranged to prevent unauthorized tampering with the angular settings of the secondary viewing surfaces.

Optionally, clear glass windows carried by each holder prevent dust and the effects of weather from reaching each of the secondary mirrors 38, 40. Each of the secondary mirrors 38, 40 is angled toward an associated intermediate mirror 30, 32, respectively.

Elongated hollow thin-walled tubes 46, 48 enclose the path of travel of a reflected image between the intermediate reflecting surfaces and the secondary reflecting surfaces. To this end, a left tube 46 is interposed so as to enclose the path of travel of an image between the left secondary reflecting surface 38 and the left intermediate reflecting surface 30. Said tube passes through appropriate aligned apertures in the body of the vehicle and is supported by the dashboard 14 and the automobile body. A right tube 48 encloses the path of travel of an image between the right secondary reflecting surface 40 and the right intermediate reflecting surface 32. This tube is similarly supported within the vehicle 10. Both tubes include clear flat transparent windows above the intermediate reflecting surfaces so as to permit unobstructed passage of reflected images between said surfaces and the primary reflecting surface. Desirably the mountings for the intermediate reflecting surfaces and the secondary reflecting surfaces allow swivelling of these surfaces for adjustment to allow said surfaces to be properly angularly oriented in a manner soon to be described.

In the preferred form of my invention, the right tube 48 is longer than the left tube 46, since the distance between the right intermediate and right secondary mirrors is longer than the distance between the left intermediate and left secondary mirrors, due to the fact that the primary mirror 22 is not, as shown, located transversely centrally of the dashboard 14 but rather is located to the left thereof, directly in front of the driver 20.

The exterior, distant ends of the tubes 46, 48 terminate closely adjacent to the holders 42, 44 and are open (or closed by a transparent pane) so that a reflected image may pass between the intermediate and the secondary mirrors. To this end, the holders 42, 44 are open (cut away) at this point so as not to block the reflected images. The fenders 19, 19' as well as any other intervening portions of the body of the automobile are also cut away so as not to block these optical axes.

Turning then to the operation of my rearview mirror system, the primary, intermediate and secondary reflecting surfaces are appropriately angled to provide optical axes wherein the incident rays which fall upon the secondary reflecting surfaces and are thereafter reflected through the system are substantially horizontal and emanate from a rearward direction, i.e., from a direction parallel to the normal direction of travel of the automobile 10. Since three reflecting surfaces are utilized for each optical axis, non-reversed images are reflected to the driver. The mirrors of the system are adjusted so that the reflected rays from the left and right secondary reflecting surfaces 38, 40 fall upon, respectively, the left intermediate reflecting surface 30 and the right intermediate reflecting surface 32, and then these rays are reflected to fall upon, respectively, the left mirror area 22*l* and the right mirror area 22*r*, which in turn are reflected from these areas to the eyes of the driver 20. FIGS. 1 and 2 illustrate the optical paths "A" of incidence and reflection of these reflected rays.

As shown therein, it will now be evident that a driver 20 of the automobile 10 by means of the rear view mirror system can observe the road, vehicles and other objects which are to the left rear of his automobile on the mirror 22 to the left of the automobile outline 24 and can also observe the road, vehicles and other objects to the right rear of his automobile on the mirror 22 to the right of the automobile outline 24.

A driver will thus realize by observance of the composite picture reflected in the primary mirror 22 on which side overtaking traffic is approaching him and can take proper precautionary measures to insure his continued safety while driving.

The mirror 22 can be tilted about a horizontal axis to make appropriate adjustment for different drivers whose eyes have a slightly different elevational position with relation to the mirror system. The intermediate and secondary reflecting surfaces are adjusted once when installed and thereafter are left unchanged.

The concavity of the right hand intermediate reflecting surface 32 in the right tube 48 compensates for the longer distance of travel for a reflected image between the right intermediate and right secondary reflecting surfaces so that when a reflected image is observed by the driver 10 on the right area 22*r* of the mirror, it will be proportionately enlarged to compensate for the aforesaid longer reflecting path.

The primary mirror 22 is concave so that an enlarged field of vision may be presented on the primary mirror without unduly enlarging the reflecting area of said surfaces. However my invention will perform satisfactorily if the mirror 22 is plane.

With my rear mirror system properly installed and adjusted, a driver of an automotive vehicle need not even shift his eyes for an instant from his normal forward view to immediately receive a picture of traffic conditions on his left side and his right side rearward of the vehicle and can be virtue of the outline 24 immediately ascertain the location of such traffic in relation to his own vehicle. A clearer, safer better rearward view is thus obtained which does not depend for its path of reflection on a clear, unobstructed rear window which, as is well known, is often blocked by various miscellaneous objects as well as dirt, snow or ice on the rear window itself.

The tubes 46, 48 may be heated so as to prevent condensation therein and so as to keep the secondary reflecting surfaces 38, 40 (or windows protecting the same) clear of ice and snow.

As has been mentioned, the primary reflecting surface 22 alternately may be located in front of the driver adjacent the top edge of the windshield 12. In such embodiment, the tubes 46, 48, the intermediate reflecting surfaces 30, 32 and the secondary reflecting surfaces 38, 40 may be located adjacent to the top edge of the windshield. The secondary reflecting surfaces 38, 40 can be positioned to reflect either downwardly or upwardly onto the primary reflecting surface. The secondary reflecting surfaces 38, 40 can in this embodiment be mounted on the outside of the vehicle on the windshield posts. It will be appreciated that other variations can be used. For example the intermediate reflecting surfaces 30, 32, the tubes 46, 48 and the secondary reflecting surfaces 38, 40 can be located at the low level shown in the drawings and yet be employed in conjunction with a primary reflecting surface 22 adjacent the top edge of the windshield. Or the intermediate reflecting surface 30, 32, the tubes 46, 48 and the secondary reflecting surfaces 38, 40 can be located adjacent the top edge of the windshield and employed in conjunction with a primary reflecting surface 22 located at the low level shown in the drawings.

Mention also should be made of the optional substitution of an optical lens system within the right hand tube 48 to compensate for the longer optical span, in place of the concavity of the right hand intermediate reflecting surface 32.

It also is within the scope of my invention, although not preferred, to shift the primary reflecting surface 22 to the center line of the vehicle in which case the optical spacing between the left intermediate reflecting surface 30 and the left secondary reflecting surface 38 is equal to that between the right intermediate reflecting surface 32 and the right secondary reflecting surface 40. In such event no optical compensation, such as the concavity of the right intermediate reflecting surface 32 is necessary.

It will be understood that my rear view reflecting system can be appropriately adjusted and modified for vehicles of different sizes, and as well may be incorporated into other types of vehicles such as trucks, boats or airplanes.

It thus will be seen that I have provided a device which achieves the several objects of my invention, and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and desire to secure by Letters Patent:

1. A rearview reflecting system for automotive vehicles and the like comprising a single primary reflecting surface located within the interior of the vehicle in the forward line of vision of the vehicle driver, said primary reflecting surface being smoothly continuous from side to side and having a central portion thereof blocked out in the outline of a transverse cross-section of the driven automobile, dual external secondary rearwardly facing reflecting surfaces located one laterally on each side of the vehicle, dual intermediate reflecting surfaces located within the interior of the vehicle, and means supporting said reflecting surfaces in such mutual angular relationship that the right and left external secondary reflecting surfaces respectively reflect horizontal rearward views to the right and left intermediate surfaces, which in turn respectively reflect said views to the right and left sides of the primary reflecting surface separated by the central blocked out portion thereof, which in turn reflect said views to the eyes of the vehicle driver, said primary, intermediate and secondary reflecting surfaces constituting the only and all of the reflecting surfaces in the system, the primary reflecting surface being situated to the left side of the vehicle so as to be in front of the driver, the length of the optical axis between the right secondary and intermediate reflecting surfaces being greater than the length of the optical axis between the left secondary and intermediate reflecting surfaces, the right and left sets of reflecting surfaces having different magnification factors, the magnification factor of the right set of reflecting surfaces being greater than the magnification factor of the left set of reflecting surfaces to compensate for said greater length of the right optical axis.

References Cited

UNITED STATES PATENTS

| | | | |
|---|---|---|---|
| 1,977,019 | 10/1934 | Smith | 350—303 |
| 2,193,217 | 3/1940 | Allen | 350—301 |
| 2,570,357 | 10/1951 | Martin | 350—296 |

JEWELL H. PEDERSEN, *Primary Examiner.*

W. L. SIKES, *Assistant Examiner.*